US010713187B2

(12) United States Patent
Filippo et al.

(10) Patent No.: US 10,713,187 B2
(45) Date of Patent: *Jul. 14, 2020

(54) MEMORY CONTROLLER HAVING DATA ACCESS HINT MESSAGE FOR SPECIFYING THE GIVEN RANGE OF ONE OR MORE MEMORY ADDRESSES

(71) Applicant: ARM Limited, Cambridge (GB)

(72) Inventors: Michael Filippo, Austin, TX (US); Jamshed Jalal, Austin, TX (US); Klas Magnus Bruce, Leander, TX (US); Paul Gilbert Meyer, Austin, TX (US); David Joseph Hawkins, Austin, TX (US); Phanindra Kumar Mannava, Austin, TX (US); Joseph Michael Pusdesris, Austin, TX (US)

(73) Assignee: ARM Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/521,621

(22) Filed: Jul. 25, 2019

(65) Prior Publication Data

US 2019/0347217 A1 Nov. 14, 2019

Related U.S. Application Data

(63) Continuation of application No. 15/427,391, filed on Feb. 8, 2017, now Pat. No. 10,402,349.

(51) Int. Cl.
*G06F 13/00* (2006.01)
*G06F 13/16* (2006.01)
(Continued)

(52) U.S. Cl.
CPC ...... *G06F 13/1642* (2013.01); *G06F 12/0833* (2013.01); *G06F 12/0844* (2013.01);
(Continued)

(58) Field of Classification Search
CPC .................................................. G06F 13/1642
See application file for complete search history.

(56) References Cited

U.S. PATENT DOCUMENTS 7,058,767 B2 * 6/2006 Dodson ............... G06F 12/0215
711/137
7,555,597 B2 * 6/2009 Srivastava .......... G06F 12/0862
370/389

(Continued)

FOREIGN PATENT DOCUMENTS

GB 2440758 2/2008

OTHER PUBLICATIONS

U.S. Appl. No. 15/427,391, filed Feb. 8, 2017, Inventor: Filippo et al.

(Continued)

Primary Examiner — Tammara R Peyton
(74) Attorney, Agent, or Firm — Nixon & Vanderhye P.C.

(57) ABSTRACT

A memory controller comprises memory access circuitry configured to initiate a data access of data stored in a memory in response to a data access hint message received from another node in data communication with the memory controller; to access data stored in the memory in response to a data access request received from another node in data communication with the memory controller and to provide the accessed data as a data access response to the data access request.

19 Claims, 8 Drawing Sheets

(51) Int. Cl.
*G06F 13/364* (2006.01)
*G06F 12/0864* (2016.01)
*G06F 13/42* (2006.01)
*G06F 13/40* (2006.01)
*G06F 12/0831* (2016.01)
*G06F 12/0844* (2016.01)

(52) U.S. Cl.
CPC ...... *G06F 12/0864* (2013.01); *G06F 13/1668* (2013.01); *G06F 13/364* (2013.01); *G06F 13/404* (2013.01); *G06F 13/4282* (2013.01); *G06F 2212/6032* (2013.04); *G06F 2212/621* (2013.01)

(56) References Cited

U.S. PATENT DOCUMENTS

| | | | |
|---|---|---|---|
| 10,282,297 B2* | 5/2019 | Mannava | G06F 12/0833 |
| 10,402,349 B2* | 9/2019 | Filippo | G06F 12/0864 |
| 2009/0182944 A1 | 7/2009 | Comparan et al. | |
| 2015/0199290 A1 | 7/2015 | Mathewson et al. | |
| 2016/0034399 A1 | 2/2016 | Giri | |

OTHER PUBLICATIONS

International Search Report and Written Opinion of the International Searching Authority dated Jun. 18, 2018 in PCT/GB2018/050191, 19 pages.

Office Action dated Jan. 2, 2019 in U.S. Appl. No. 15/427,391, 13 pages.

\* cited by examiner

MEMORY CONTROLLER HAVING DATA ACCESS HINT MESSAGE FOR SPECIFYING THE GIVEN RANGE OF ONE OR MORE MEMORY ADDRESSES

CROSS-REFERENCE

This application is a continuation of U.S. application Ser. No. 15/427,391, filed Feb. 8, 2017, the entire contents of which are hereby incorporated by reference in this application.

BACKGROUND

This disclosure relates to data processing.

Data transfer protocols can regulate the operation of data transfers between devices or nodes connected to one another via interconnect circuitry, for example in the context of a system on chip (SoC) or network on chip (NoC) system. An example of such a data transfer protocol is the so-called AMBA (Advanced Microcontroller Bus Architecture) CHI (Coherent Hub Interface) protocol.

In the CHI protocol, nodes can be categorised as request nodes (RN), home nodes (HN) or slave nodes (SN). Nodes can be fully coherent or input/output (I/O) coherent. A fully coherent HN or RN (HN-F, RN-F respectively) includes coherent cache storage; a fully coherent SN (SN-F) is paired with an HN-F. An HN-F can manage coherency and/or serialisation for a memory region, and may be referred to as an example of a point of coherency (POC) and/or point of serialisation (POS).

Here, the term "coherent" implies that that data written to a memory address in the coherent memory system by one node is consistent with data read from that memory address in the coherent memory system by another of the nodes. A role of logic associated with the coherence function is therefore to ensure that before a data handling transaction takes place, if the version of the data item to be accessed is out of date (because of a modification made to another copy of the same data item), the copy to be accessed is first brought up to date. Similarly, if the data handling transaction involves modifying a data item, then coherence logic avoids conflicts with other existing copies of the data item.

Serialisation relates to the ordering of the handling of memory access requests from potentially multiple requesting nodes, and potentially taking different latency periods to be serviced, so that the results from those requests are presented in the correct order to the requesting nodes, and any dependencies between the requests (for example, a data read subsequent to a data write to the same address) are correctly handled.

Data accesses such as read requests may be made via the HN-F, which may either service the read request itself (for example, by accessing a cache memory) or may refer the read request to an SN-F for resolution, for example, if the required data item has to be read from main memory or a higher level cache memory. In such examples, the SN-F may comprise a dynamic memory controller (DMC) associated with a memory such as a dynamic random access memory (DRAM). The HN-F handles the issuing of a read request to the SN-F in instances in which the HN-F cannot itself service the request.

Other example protocols include the AXI (Advanced Extensible Interface) or ACE (AXI Coherency Extensions) protocols. The ACE protocol does not make use of a HN for example, but can provide a POC/POS, for example implemented by an interconnect.

SUMMARY

In an example arrangement there is provided a memory controller comprising:
  memory access circuitry configured:
  to initiate a data access of data stored in a memory in response to a data access hint message received from another node in data communication with the memory controller;
  to access data stored in the memory in response to a data access request received from another node in data communication with the memory controller and
  to provide the accessed data as a data access response to the data access request.

In another example arrangement there is provided a memory control method comprising:
  initiating a data access of data stored in a memory in response to a data access hint message received from another node in data communication with the memory controller;
  accessing data stored in the memory in response to a data access request received from another node in data communication with the memory controller; and
  providing the accessed data as a data access response to the data access request.

In another example arrangement there is provided data processing circuitry comprising:
  predictor circuitry to store prediction data indicating whether recent data access requests were fulfilled by a first data source or a second data source and to predict, from the prediction data, whether a next data access request will be fulfilled by the first data source or the second data source, the first and second data sources being arranged so that if a data access request is not fulfilled by the first data source, it is fulfilled by the second data source; and
  issue circuitry to issue the data access requests to the first data source, the issue circuitry being configured to issue an indication, to the second data source, that a given data access request may need to be fulfilled by the second data source in response to the predictor circuitry predicting that the given data access request will be fulfilled by the second data source.

In another example arrangement there is provided a data processing method comprising:
  storing prediction data indicating whether recent data access requests were fulfilled by a first data source or a second data source;
  predicting, from the prediction data, whether a next data access request will be fulfilled by the first data source or the second data source, the first and second data sources being arranged so that if a data access request is not fulfilled by the first data source, it is fulfilled by the second data source; and
  issuing an indication, to the second data source, that a given data access request may need to be fulfilled by the second data source in response to the predictor circuitry predicting that the given data access request will be fulfilled by the second data source.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
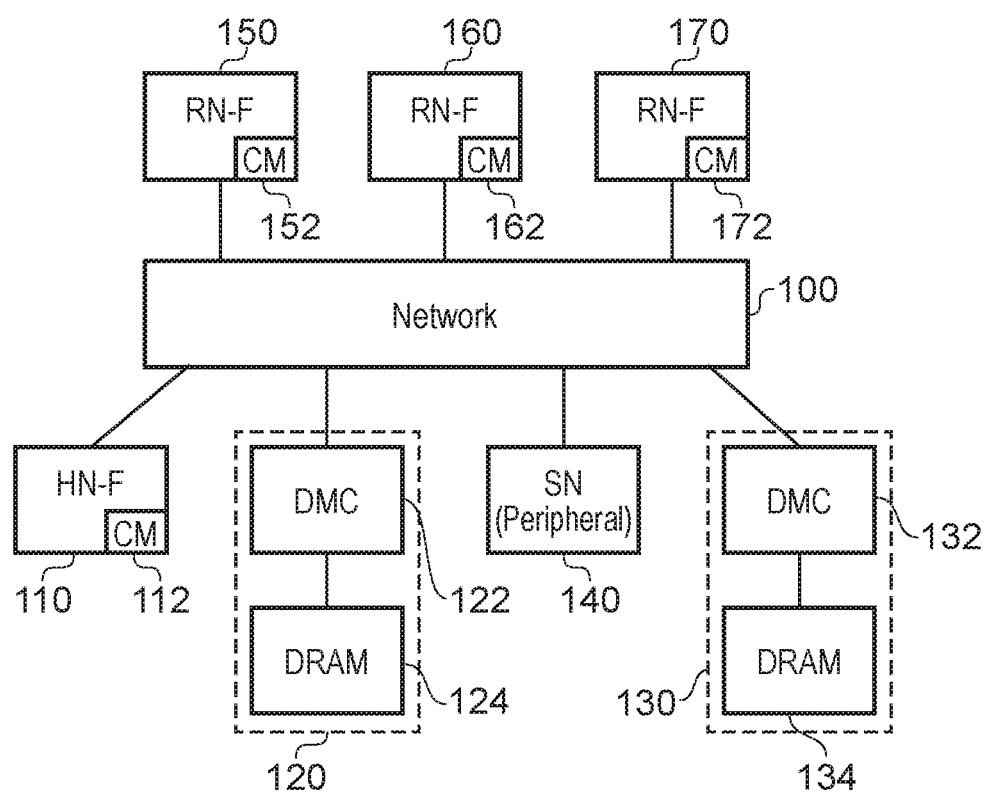
FIG. 1 schematically illustrates a data processing apparatus.

Before discussing the embodiments with reference to the accompanying figures, the following description of embodiments is provided.

An example embodiment provides a memory controller comprising:

memory access circuitry configured:
  to initiate a data access of data stored in a memory in response to a data access hint message received from another node in data communication with the memory controller;
  to access data stored in the memory in response to a data access request received from another node in data communication with the memory controller and
  to provide the accessed data as a data access response to the data access request.

In example embodiments, the latency associated with a data access request, such as a data access request which is routed to the memory controller via another node such as a home node, can be potentially reduced by providing for the memory controller to respond to a data access hint indicating a possible subsequent data access request. When the subsequent data access request is received, the relevant data access may already have been started.

In examples, the data access hint message and the data access request each specify a data access by a range of one or more memory addresses. For example, when the memory access circuitry has initiated a data access for a given range of one or more memory addresses in response to a data access hint message, the memory access circuitry is configured to provide the accessed data as a data access response only when the memory controller receives a subsequent data access request specifying the given range of one or more memory addresses. In this way, a data access hint message can initiate a data access but that data access is not completed unless a subsequent data access request is received.

For routing of a response, for example in cases where the data access request arrives via another node such as a home node, the data access request may specify another node, in data communication with the memory controller, to which the data access response should be provided.

In examples, it can be optional for a recipient node to act upon, or not act upon, a data access hint message, for example in dependence on current loading. In such examples, the memory access circuitry is configured to determine whether or not to initiate a data access in response to a received data access hint message.

Example arrangements can also provide a data processing system comprising one or more master nodes each having an associated cache memory; one or more slave nodes each comprising a memory controller as defined above; and a home node to control coherency amongst data stored by the data processing system.

In examples, the one or more master nodes are configured to issue data access requests to the home node; and the home node is configured to detect whether a data access request can be fulfilled by the home node or the data access requires an access to one or more slave nodes and, when an access to one or more slave nodes is required, to send a data access request to the one or more slave nodes. For example, the one or more master nodes may be configured to send either: a data access request to the home node; or a data access request to the home node and a data access hint message to that one of the one or more slave nodes which will fulfil the data access specified by the data access request when the home node is unable to fulfil that data access.

In examples, the selection of what should be issued by a master node can be made by the one or more master nodes comprising prediction circuitry to determine whether to send the data access hint message.

In examples, the prediction circuitry is configured to determine whether to send the data access hint message to a slave node in response to indications, received from one or both of the home node and the slave node, indicating whether the slave node fulfilled one or more previous data access requests.

Another example embodiment provides a memory control method comprising:

initiating a data access of data stored in a memory in response to a data access hint message received from another node in data communication with the memory controller;

accessing data stored in the memory in response to a data access request received from another node in data communication with the memory controller; and providing the accessed data as a data access response to the data access request.

Another example embodiment provides data processing circuitry comprising:

predictor circuitry to store prediction data indicating whether recent data access requests were fulfilled by a first data source or a second data source and to predict, from the prediction data, whether a next data access request will be fulfilled by the first data source or the second data source, the first and second data sources being arranged so that if a data access request is not fulfilled by the first data source, it is fulfilled by the second data source; and issue circuitry to issue the data access requests to the first data source, the issue circuitry being configured to issue an indication, to the second data source, that a given data access request may need to be fulfilled by the second data source in response to the predictor circuitry predicting that the given data access request will be fulfilled by the second data source.

In these example embodiments, an indication (such as a read hint message) can be issued or not issued to a second data source on the basis of a prediction relating to whether the data access will be fulfilled by the second data source. In this way, transmission bandwidth can be conserved (in comparison to sending read hint messages for every data access) but still with the potential to reduce latency by allowing the second data source to initiate a data access in response to a read hint message.

In some examples, the predictor circuitry is configured to store the prediction data in response to information received from one or both of the first and second data sources indicating which data source fulfilled a recent data access request. The prediction can be based on such stored data.

In some examples, the prediction data comprises a count value, the predictor circuitry being configured to change the count value in dependence upon whether a recent data access request was fulfilled by the first or the second data source. For example, the predictor circuitry may comprise a comparator to compare the count value with a threshold value.

In some examples, the predictor circuitry is configured to change the count value by a first change amount in response to a recent data access being fulfilled by the first data source, and by a second change amount, having an opposite polarity to the first change amount, in response to a recent data access being fulfilled by the second data source. These change amounts may be fixed or the predictor circuitry may be configured to vary one or both of the first change amount and the second change amount.

To allow for potentially different likelihoods of making use of a read hint message, in some examples the predictor circuitry is configured to generate respective predictions for two or more classes of data access requests. For example, the two or more classes of data access requests may be selected from the list consisting of:
    data read requests;
    instruction fetch requests; and
    address translation fetch requests.

To allow for differences between different data access requests, in some examples the predictor circuitry is configured to generate a prediction in dependence upon one or more of:
    a program counter value for a processing instruction initiating a data access request;
    an address of a data item to be accessed in response to the data access request.

In some examples the predictor circuitry is configured to generate an index from one or both of the program counter value and the address of the data item, and to access a table of counter values by the index. In order to alleviate aliasing (the undesired accessing of the same prediction data by the same index but in dependence upon different values of program counter and/or address), in some examples the predictor circuitry is configured to generate a tag from one or both of the program counter value and the address of the data item and to store the tag in association with an entry in the table of counter values which is accessed by the index. For example, the predictor circuitry may be configured to retrieve a stored tag and to compare the retrieved tag with the tag generated from one or both of the program counter value and the address of the data item.

In some examples, the predictor circuitry is configured to access two or more tables of counter values by respective indices generated from different respective portions of one or both of the program counter value and the address of the data item. For example, when two or more tables have a stored tag which matches a generated tag, the predictor circuitry is configured to generate the prediction in dependence upon a counter value stored by that one of the two or more tables for which the index was generated by the greater number of bits of one or both of the program counter value and the address of the data item.

Example arrangements also provide data processing apparatus comprising:
    one or more master nodes each comprising circuitry as defined above and each having an associated cache memory;
    a home node providing the first data source, the home node being configured to detect whether it can fulfil a given data access request by obtaining the requested data from one or more of the cache memories and configured to request the requested data from the second data source when the home node is unable to fulfil the given data access request; and
    one or more slave nodes each having a higher level memory, providing the second data source.

In some examples, the master node is configured to issue a transmission request, requesting a data transmission to one of the one or more slave nodes, to the home node; and the home node is configured to serialise transmission requests and access requests to the one or more slave nodes so that data written to a memory address at a slave node is consistent with data read from that memory address in response to a subsequent access request.

In some examples, the home node is configured to control coherency across the cache memories of the one or more master nodes, and the higher level memories of the one or more slave nodes, as a coherent memory system so that data written to a memory address in the coherent memory system by one node is consistent with data read from that memory address in the coherent memory system by another of the nodes.

Another example embodiment provides a data processing method comprising:
    storing prediction data indicating whether recent data access requests were fulfilled by a first data source or a second data source;
    predicting, from the prediction data, whether a next data access request will be fulfilled by the first data source or the second data source, the first and second data sources being arranged so that if a data access request is not fulfilled by the first data source, it is fulfilled by the second data source; and
    issuing an indication, to the second data source, that a given data access request may need to be fulfilled by the second data source in response to the predictor circuitry predicting that the given data access request will be fulfilled by the second data source.

Referring now to the drawings, FIG. 1 schematically illustrates a data processing apparatus embodied as a network of devices interconnected by a network 100. The apparatus may be provided as a single integrated circuit such as a so-called system on chip (SoC) or network on chip (NoC) or as a plurality of interconnected discrete devices.

Various so-called nodes are connected via the network 100. These include one or more home nodes (HN) 110 which oversee data coherency within the networked system, one or more slave nodes (SN) such as a higher level cache memory 120 (the reference to "higher level" being with respect to a cache memory provided by a requesting node and described below), a main memory 130 and a peripheral device 140. The selection of slave nodes shown in FIG. 1 is by way of example, and zero or more of each type of slave node may be provided.

The slave nodes 120, 130 each comprise, in this example, a memory controller (DMC) 122, 132, and a memory (DRAM) 124, 134.

FIG. 1 also shows a plurality of so-called requesting nodes (RN) 150, 160, 170, which in this example operate according to the CHI (coherent hub interface) protocol.

The RNs 150, 160, 170 are fully coherent RNs (RN-F) having an associated cache memory 152, 162, 172. The RN 170 may also be an RN-F and may have a cache memory 172.

More generally, the nodes can be fully coherent or input/output (I/O) coherent. A fully coherent HN or RN (HN-F, RN-F respectively) includes coherent cache storage. For example, the HN-F 110 comprises cache storage 112.

A fully coherent SN (SN-F) is paired with an HN-F. An HN-F can manage coherency for a memory region.

FIG. 1 provides an example of a data processing system comprising one or more master nodes 150, 160, 170 each having an associated cache memory 152, 162, 172; one or more slave nodes 120 each comprising a memory controller; and a home node 110 to control coherency amongst data stored by the data processing system.

Similarly, FIG. 1 provides an example of data processing apparatus comprising one or more master nodes 150, 160, 170 each comprising predictor and issue circuitry (discussed below) and each having an associated cache memory 152, 162, 172; a home node 110 providing a first data source, the home node being configured to detect whether it can fulfil a given data access request by obtaining the requested data from one or more of the cache memories and configured to request the requested data from a second data source such as a slave node 120, 130 when the home node is unable to fulfil the given data access request; and one or more slave nodes 120, 130 each having a higher level memory, providing the second data source.

Figure 2:
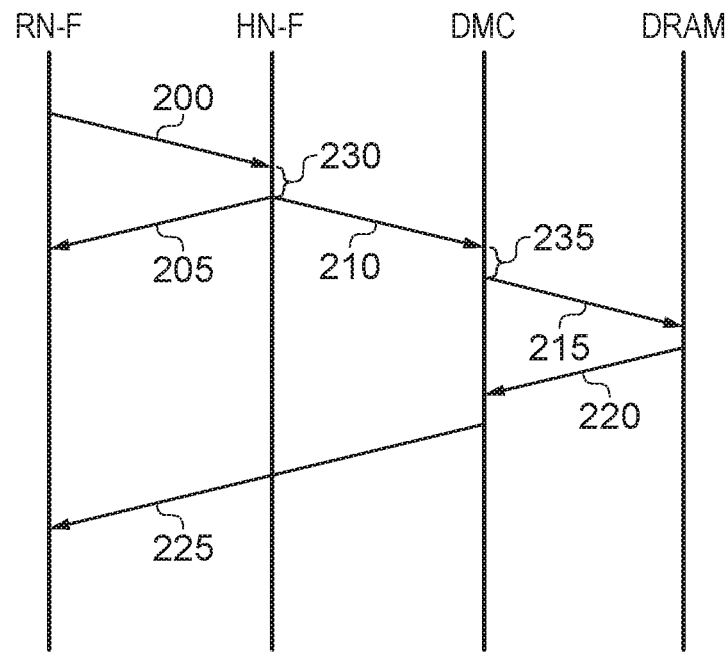
FIG. 2 is a schematic timing diagram illustrating a data read access.

FIG. 2 is a schematic timing diagram illustrating a data read access.

In FIG. 2, one of the requesting nodes RN-F 150, 160, 170 is attempting to read data which is overseen (from a coherency point of view) by the home node HN-F 110. The HN-F acts as a so-called point of coherency (PoC). In terms of managing the ordering of handling of temporally overlapping data access requests, or data access requests where the results of one data access request are at least relevant to the timing of completion of another data access request, the HN-F may also act as a so-called point of serialisation (PoS) to ensure that such data access requests are initiated and/or completed in the appropriate order.

Therefore, in examples, the master node is configured to issue a transmission request, requesting a data transmission to one of the one or more slave nodes, to the home node; and the home node is configured to act as a PoS to serialise transmission requests and access requests to the one or more slave nodes so that data written to a memory address at a slave node is consistent with data read from that memory address in response to a subsequent access request. In examples, the home node is configured to act as a PoC to control coherency across the cache memories of the one or more master nodes, and the higher level memories of the one or more slave nodes, as a coherent memory system so that data written to a memory address in the coherent memory system by one node is consistent with data read from that memory address in the coherent memory system by another of the nodes.

The requesting node sends a data read request 200 to the home node. The home node detects whether it can service or fulfil the request itself, in which case it provides a data read response 205 to the requesting node and the process is finished.

Servicing the read request by the home node could involve the home node retrieving the requested data from its own cache memory (if it has one) and/or retrieving the requested data from a cache memory (such as one or more of the cache memories 152, 162, 172) managed by the home node in its role as a PoC. The home node can, in some examples, detect whether it holds a latest or valid version of the requested data, or a cache memory under its coherency management holds a latest or valid version of the requested data, by consulting records maintained by the home node as PoC (such as a so-called snoop filter) indicating the data held by each cache memory under its control as PoC, or by querying one or more of the cache memories. The particular technique used by the home node to detect whether it can service the read request depends upon the system architecture in use. The detection, by the home node, of whether it can service the read request can be a pre-emptive detection (for example, using a snoop filter as mentioned above) or can be a detection resulting from a failure, by the home node, to successfully complete an attempt to service the read request.

Servicing the read request by the home node implies that an access is not made to the memories 120, 130 in order to service the read request.

If, however, the home node detects that it cannot service the request itself, it in turn sends a read request 210 to the appropriate slave node SN 120, 130. The memory controller (DMC) of the slave node receives the request and, as a transaction 215, 220, reads the required data from the memory (DRAM). The memory controller then returns the data as a read response 225 to the requesting node, either via the home node or, as indicated in the example of FIG. 2, directly to the requesting node. In examples, the read request provided by the home node can specify another node (such as the RN), in data communication with the memory controller, to which the read response should be provided.

Therefore the home node and the slave node respectively provide examples of first and second data sources, arranged so that if a data access request is not fulfilled by the first data source, it is fulfilled by the second data source.

Latency in a memory access is (in at least some situations) important or even critical to system performance. In the example of FIG. 2, latency is introduced—in the case that a memory read request has to be referred on to the DRAM—as a delay 230 between the home node receiving the request 200 and issuing the request 210, and a delay 235 between the DMC receiving the request 210 and initiating the transaction 215.

Figure 3:
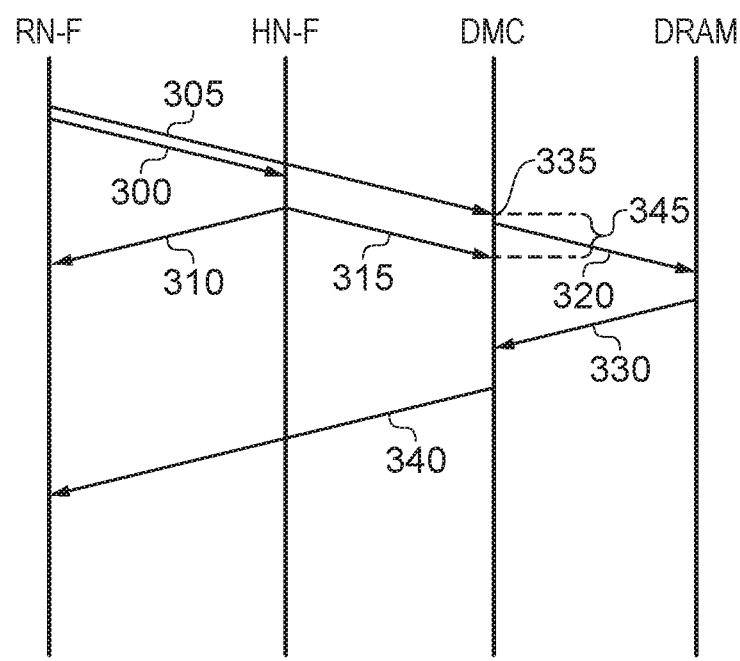
FIG. 3 is a schematic timing diagram illustrating a data read access.

FIG. 3 is a schematic timing diagram illustrating a data read access according to an example embodiment of the present disclosure.

The RN-F issues a data read request 300 as described with reference to FIG. 2, but also issues a so-called "read hint" 305 directly to the memory controller of the slave node which will have to service or fulfil the read request if the home node cannot itself do so. The RN-F can detect which slave node is relevant to a read request from system configuration or memory map information. For example, this may be so-called System Address Map (SAM), established as a system level configuration, and providing a mapping between address ranges and destinations in the network or apparatus of FIG. 1. In example arrangements, each node has a unique (within that system and at that time) identification (ID). A packet specifies a target ID to be sent to, and a source ID to which a response should be returned.

A packet such as a read request can be sent to a home node (or a miscellaneous node, not discussed further in connection with the present technique) which can be an HN-F (fully coherent) or an HN-I (input/output coherent). The SAM logic of an RN can use a hashing function on an address to arrive at a selection of a particular HN to use. Additional configuration information maps the particular HN to a node ID.

The RN-F 150, 160, 170 also provide SAM functionality similar to that described above to detect which slave node a request will be handled by, if the HN-F does not fulfil the data access request itself. So, a set of one or more slave nodes are also mapped to address ranges by the SAM functionality of each of the RN-Fs. Therefore, for an individual address, there may be a HN mapped to that address, which is where the RN-F will send a read request, and also a SN-F mapped to that same address, which is where the RN-F will send a read hint (if applicable). The read hint is addressed using the target ID of the slave node, whereas the read request is addressed using the target ID of the HN.

Therefore, in examples, the requesting or master node is configured to access address configuration information which maps an address or address range (for example, relating to a data access request) to a home node and to a slave node, for example so that the master or requesting node can issue a data access request (such as a read request), applicable to an address or address range to be accessed, to the home node and a data access hint (such as a read hint), applicable to that same address or address range, to the slave node.

The home node proceeds as described above, either returning the required data as a read response 310 or sending a read request 315 to the slave node (again, using similar SAM functionality if necessary, to detect which slave node to use, and/or the pairing arrangement mentioned above). However, in the present case, the slave node has already initiated a transaction 320, 330 to retrieve the required data in response to receipt at a time 335 of the read hint 305. So, rather than the slave node waiting until receipt of the read request 315 to even start the transaction 320, the memory controller is able to start the transaction 320 earlier in response to receipt of the read hint 305. As before, once the memory controller receives the required data it provides the required data as a read response 340 to the RN-F.

The earlier initiation of the transaction 320, 330 because of the provision of the read hint 305 allows a saving in latency of a period 345. The length of such a period depends on many different design parameters and aspects of the system, but in example embodiments such a saving can be significant in relation to the overall time taken for a data read from the DRAM.

Figure 4:
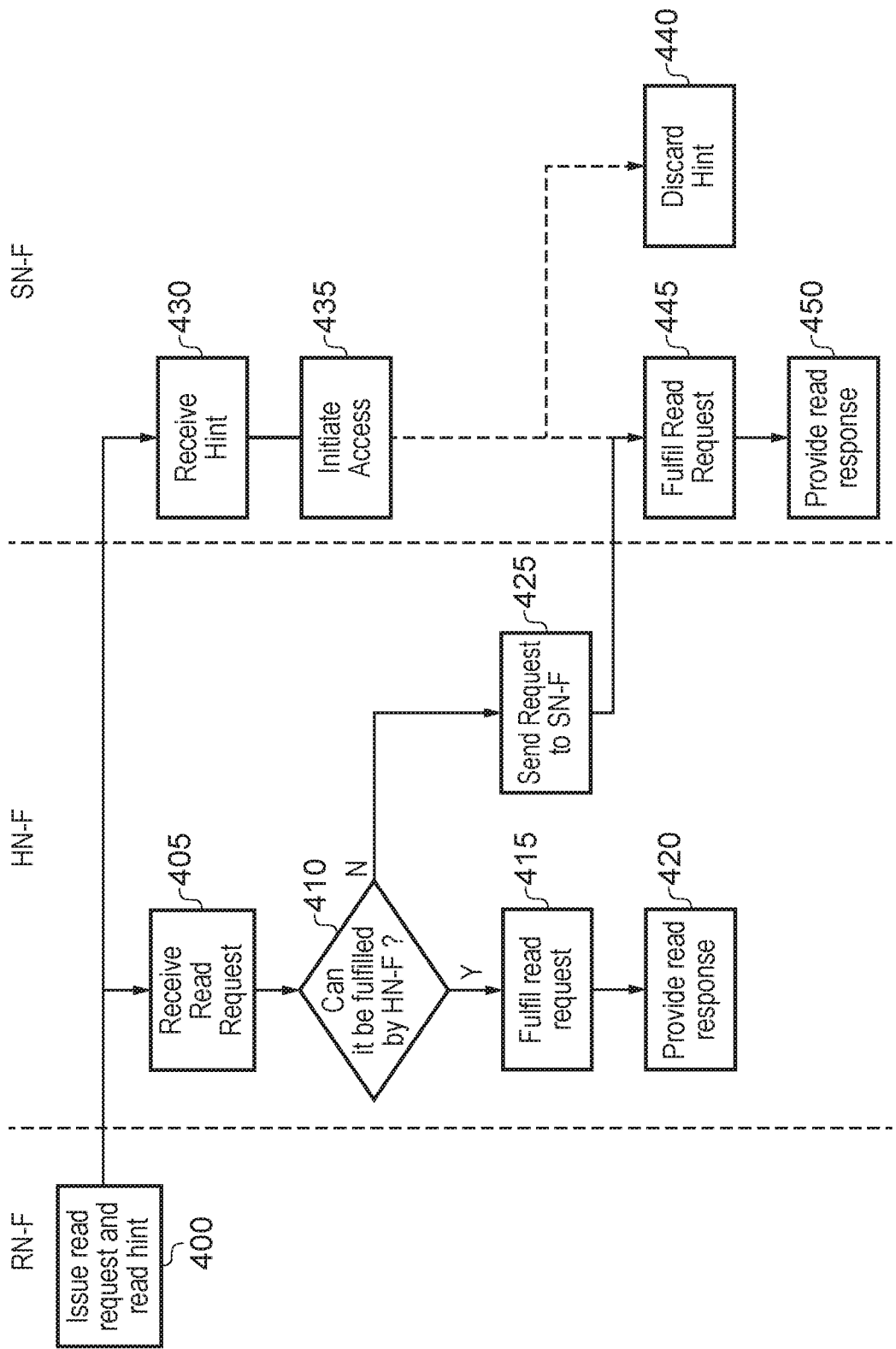
FIG. 4 is a schematic flowchart illustrating a method.

FIG. 4 is a schematic flowchart illustrating the method just described with reference to FIG. 3. In FIG. 4, broken vertical (as drawn) lines separate activities of the requesting node, activities of the home node and activities of the slave node.

The process shown in FIG. 4 is initiated by the requesting node issuing, at a step 400, a read request and a read hint. The read request is issued to the home node relevant to the required address or address range, and the read hint is issued to the slave node relevant to that address or address range and which, if the home node cannot service the read request, will need to service the read request. The read request and read hint can be issued by the requesting node in either order, or together.

At a step 405, the home node receives the read request 300 and detects, at a step 410, whether the read request can be fulfilled by the home node. For example, the home node may look up the request in a cache, snoop filter or the like to detect whether the read request 300 can be satisfied by the home node.

If the answer is yes, then at a step 415 the home node fulfils the read request and, at a step 420 provides the read response 310 to the requesting node.

If the answer is no at the step 410, then at a step 425 the home node sends the request 315 to the slave node. This ends the involvement of the home node in this particular transaction.

Separately, at a step 430, the slave node receives the hint 305 from the requesting node and, at a step 435, initiates the transaction 320 to access the memory. The flow of control at the slave node can then follow one of two paths and distinctions between these paths will be discussed further below. In one path, if a hint 305 is received but no subsequent read request 315 is received, implying (for example) that the hint 305 was unnecessary and the home node could in fact service the request with a read response 310, then the hint is discarded at a step 440 and the memory transaction which was initiated in response to receipt of the hint is terminated.

On the other hand, if a request 315 has been received, then the transaction 320, 330 is completed, albeit slightly earlier than otherwise because of the advanced initiation at the step 435, and the read request is fulfilled at a step 445 before a response 340 is provided at a step 450.

A read hint can be a type of message or instruction in a network of the type shown in FIG. 1 which, unlike at least some other types of message or instruction, does not require action and unlike at least some other types or message, does not require a response. A slave node can discard or ignore a read hint, for example if the slave node is already fully loaded with other activities. Indeed, an intermediate node can discard or fail to pass on a read hint, for example if the buffering and/or transmission capacity of that intermediate node is fully loaded. A slave node is not required to provide a response or acknowledgement of receipt relating to a read hint. Therefore, in examples, the memory access circuitry can be configured to determine whether or not to initiate a data access in response to a received read hint.

In FIG. 4, the one or more master nodes are configured to issue (400) data access requests to the home node; and the home node is configured to detect (410) whether a data access request can be fulfilled by the home node or the data access requires an access to one or more slave nodes and, when an access to one or more slave nodes is required, to send (425) a data access request to the one or more slave nodes. In examples, the one or more master nodes are configured to send either a data access request 200 to the home node; or a data access request 300 to the home node and a data access hint message 305 to that one of the one or more slave nodes which will fulfil the data access specified by the data access request when the home node is unable to fulfil that data access.

Figure 5:
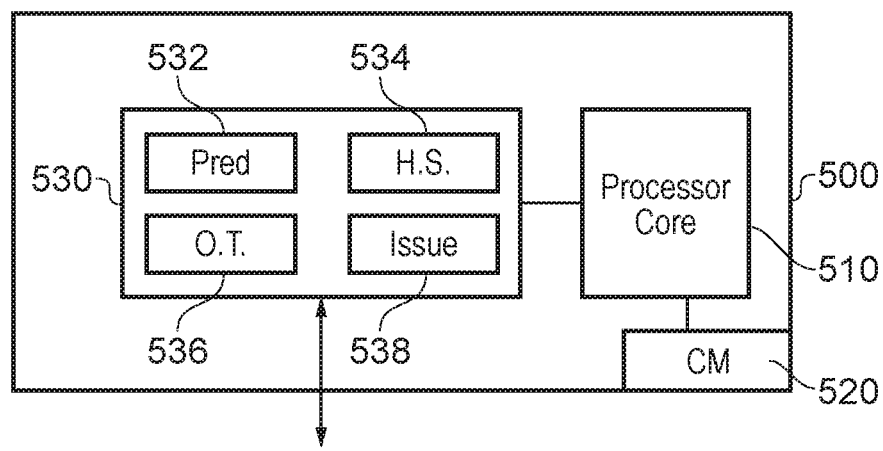
FIG. 5 schematically illustrates a master node.

FIG. 5 schematically illustrates part of the functionality of a requesting node RN-F 500. This example relates to a single processor core (as described below) but could similarly apply to a group or "cluster" of processors. A processor core 510 performs processing operations on the basis of processor instructions and also accesses a cache memory 520. The processor core initiates data processing transactions via the network 100 in FIG. 1 and comprises circuitry 530 to issue and handle such transactions.

The circuitry 530 comprises: predictor circuitry 532, a history store 534, an outstanding transaction buffer 536 and issue logic 538. The functions of the predictor circuitry 532 and the history store 534 will be discussed below. The issue logic 538 handles the issue of data read or write requests to the network, and the outstanding transaction store 536 maintains details of requests which have been issued and for which a completion response has not yet been received.

Therefore, in FIG. 5, the one or more master nodes 500 comprise prediction circuitry 532 to determine whether to send the data access hint message.

FIG. 5 also provides an example of data processing circuitry comprising predictor circuitry 532 to store prediction data (for example in the history store 534) indicating whether recent data access requests were fulfilled by a first data source (such as a home node) or a second data source (such as a DRAM) and to predict, from the prediction data, whether a next data access request will be fulfilled by the first data source or the second data source, the first and second data sources being arranged so that if a data access request is not fulfilled by the first data source, it is fulfilled by the second data source; and issue circuitry 538 to issue the data access requests 300 to the first data source, the issue circuitry being configured to issue an indication (such as a read hint 305), to the second data source, that a given data access request may need to be fulfilled by the second data source in response to the predictor circuitry predicting that the given data access request will be fulfilled by the second data source.

Figure 6:
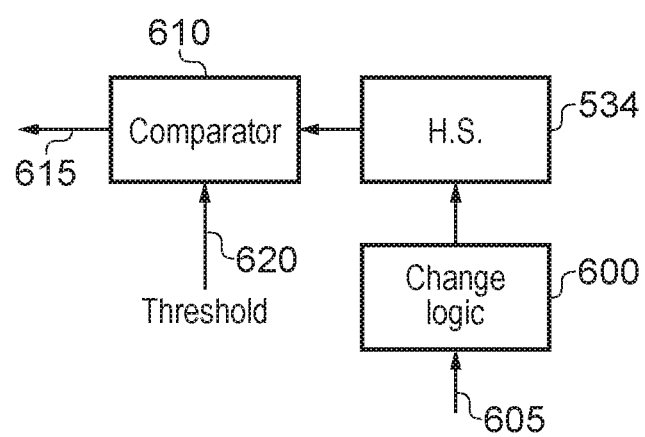
FIG. 6 schematically illustrates predictor circuitry.

FIG. 6 schematically illustrates an example of the operation of the predictor circuitry 532. The history store 534 maintains, for example, a count value. The count value is changed by change logic 600 in response to information 605 received about how previous read transactions were handled. For example, if a read transaction is handled such that its response is received from the home node, then the count held by the history store 534 can be decremented, for example reduced by one. If the read response indicates that the transaction was handled by DRAM, the count held by the history store 534 can be incremented, for example increased by one.

A comparator 610 compares the current count held by the history store 534 with a threshold 620. If the current count is greater than the threshold (indicating that a lot of the recent transactions have been handled by DRAM) then the prediction logic 532 can indicate (for example by a signal 615) to the issue circuitry 538 to issue a read hint at the same time as issuing a read request. On the other hand, if the count value is less than or equal to the threshold, the signal 615 may indicate that a read hint is not issued.

Note that the read hint can be issued simultaneously with the read request if the so-called command bandwidth allows. That is to say, if a physical bus is provided to carry such commands and space on that bus allows both to be issued at the same time, this can take place. If the read request and the read hint have to be issued at different times, then it is in some examples an arbitrary choice as to which one is issued first.

One reason for using circuitry of the type shown in FIG. 6 (and in other examples discussed below) is to avoid the situation where a read hint is issued alongside, or in association with, every read request. To do so could place a burden on the overall system because of the need to propagate the read hints across the network to the relevant slave node. So, although the issue of a read hint with every read request could (at least in some examples) guarantee that the latency advantage discussed above is met in instances that the home node cannot service the read request, this would be at the expense of system performance in terms of potentially overloading the message transmission bandwidth available for transmitting information between the nodes. So, circuitry of the type shown in FIG. 6, or other examples to be discussed below, can provide a prediction or estimate of whether it is likely that a read hint would be useful or appropriate in connection with a particular read request. In this way, fewer read hints are issued (than in the comparative situation where a read hint is issued with every read request), but the aim of the circuitry of FIG. 6 or the other examples to be discussed below is that the read hints which are in fact issued will tend to be read hints that are useful or appropriate to the respective read requests.

Note that as discussed above, a read hint does not have to be forwarded by an intermediate node or actioned by a recipient slave node. Therefore, in some examples, prediction circuitry of the type discussed here as being provided at the RN could instead, or in addition, be provided at an intermediate node or a slave node, providing information for the intermediate node and/or the slave node as to whether to forward and/or action the read hint respectively.

The change logic 600 handles the incrementing or decrementing of the count held by the history store 534. It is not a requirement that the size of the increment and the size of the decrement are one, or are even the same. For example, the count could be decremented by one for each transaction handled by the home node but incremented by two for each transaction handled by the DRAM. In some examples, the increments and decrements can be changed on an adaptive basis during operation, for example if the issue circuitry 538 detects that too many, or too few read hints are being issued in comparison with, for example, a target rate of issuing read hints. Similarly, the threshold 620 could be adapted on the same basis, for example by the issue circuitry 538. It is also not a requirement that the count is incremented when a transaction is handled by the DRAM and decremented when it is handled by the home node itself. As long as the changes are of opposite polarities, either sense could be used. Similarly, depending on the polarity of the changes applied by the change logic 600, the test performed by the comparator 610 could be any of: greater than the threshold 620, greater than or equal to the threshold 620, less than the threshold 620, or less than or equal to the threshold 620. In general the comparison with the threshold 620 can be arranged such that (whichever polarity of change and comparison is used), a predominance of requests being serviced by DRAM would tend to lead to the prediction circuitry indicating that a next read request should be accompanied by a read hint, and a predominance of requests being serviced by the home node would tend to lead to the prediction circuitry indicating that a next read request should not be accompanied by a read hint. In general, in examples the predictor circuitry is configured to change the count value by a first change amount in response to a recent data access being fulfilled by the first data source, and by a second change amount, having an opposite polarity to the first change amount, in response to a recent data access being fulfilled by the second data source. As discussed, adaptive variation can be used so that in examples the predictor circuitry is configured to vary one or both of the first change amount and the second change amount.

In these examples, the prediction data comprises a count value, the predictor circuitry being configured to change the count value in dependence upon whether a recent data access request was fulfilled by the first or the second data source.

The example of FIG. 6 provides a single counter and so provides an example of a prediction based upon a phased operation of a program such that the program might fall into generally cache-miss or generally cache-hit behaviour. A single counter provides an elegantly simple way of tracking this bias towards cache-hit or cache-miss operation. In other examples, a more complicated count arrangement is used, providing a correspondingly more detailed prediction arrangement.

The use of the information 605 can provide an example in which the prediction circuitry is configured to determine whether to send the data access hint message to a slave node in response to indications 605, received from one or both of the home node and the slave node, indicating whether the slave node fulfilled one or more previous data access requests. In examples, the predictor circuitry is configured to store the prediction data in response to information received from one or both of the first and second data sources indicating which data source fulfilled a recent data access request.

The example of FIG. 6 uses a "hard" comparison by the comparator 610 with a threshold (an example of a comparator to compare the count value with a threshold value) to give a yes/no outcome as to whether a read hint should be issued. In other examples, the size of the count could provide a likelihood indication that a hint will be useful, such that the comparator can generate an indication of whether or not to send a read hint based on this likelihood and other factors (such as the rate of generating read hints against a desired rate, as discussed above). So, the count can instead indicate a "soft" likelihood rather than being applied as a hard comparison.

The RN and/or the prediction circuitry can store information indicating whether a read hint was in fact issued for a particular read request. This information can be used in conjunction with return information from the slave node as to whether a read hint was useful, and/or in conjunction with information returned from the salve node indicating that the slave node serviced a particular read request, in an example manner discussed below.

Figure 7:
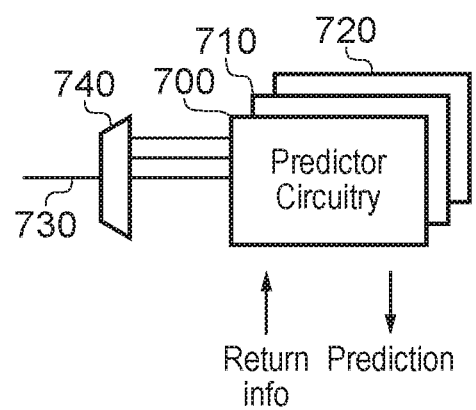
FIG. 7 schematically illustrates predictor circuitry.

FIG. 7 schematically illustrates multiple instances 700, 710, 720 of predictor circuitry, for example one for each of multiple classes of read transaction such as: (i) data read operations; (ii) an instruction fetch operations; (iii) memory address translation information fetching, for example for use by a memory management unit (MMU). The prediction circuitries 700, 710, 720 can be of the type shown in FIG. 6 or of the types discussed below. According to the type of transaction 730, the respective one of the instances 700 . . . 720 can be selected for operation by a schematic multiplexer 740. The output of the appropriate predictor circuitry is used as the current prediction, and information received back indicating whether the prediction was appropriate (such as the indication 605 of whether a previous request was handled by the home node or by DRAM, but in other examples to be discussed below different, more detailed information can be provided in addition or instead) is provided to that respective predictor circuitry.

Therefore FIG. 7 provides an example in which the predictor circuitry is configured to generate respective predictions for two or more classes of data access requests. For example, the two or more classes of data access requests can be selected from the list consisting of data read requests; instruction fetch requests; and address translation fetch requests.

Figure 8:
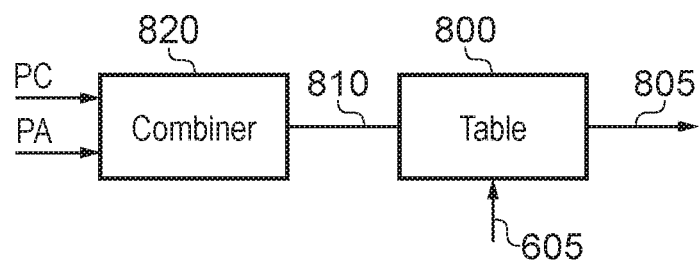
FIG. 8 schematically illustrates a part of predictor circuitry.

FIG. 8 schematically illustrates a table of count values or other information provided by a table 800, and addressed by address information 810 generated by a combiner 820 which combines, for example, bits of a program counter value appropriate to the instruction initiating the current read operation and/or bits of a physical address (PA) being accessed by the current operation (for example, the lowest physical address in a range of addresses being accessed). The combination performed by the combiner 820 can be, for example, a hash operation, a so-called folding operation in which groups of bits of the respective value are combined with one another, or the like.

The table 800 holds multiple count values. In response to the address information 810, one of the count values is selected for access and is output as a count value 805 (for example, to a comparator similar to the comparator 610 of FIG. 6). When information 605 is received relating to the outcome of a previous read request (for example, whether it was serviced by the home node or by DRAM) the respective count value appropriate to that read request (as determined by the combiner 820 using PA/PC information appropriate to that read request) is changed, for example using change logic 600 or similar, for example incremented or decremented.

So, FIG. 7 provided an example of prediction circuitry partitioned (in terms of its operation) according to a class of read request. FIG. 8 provides an example of prediction circuitry partitioned (in terms of its operation) according to a dependence upon one or both of the PC and PA relevant to a read request.

Note that the operation of the combiner 820 can lead to instances of so-called aliasing in which different sets of values of (one or both of) the PA and PC can lead to the generation of identical address information 810. This potential issue can be at least partially alleviated by the example of FIG. 9 to be discussed below.

Figure 9:
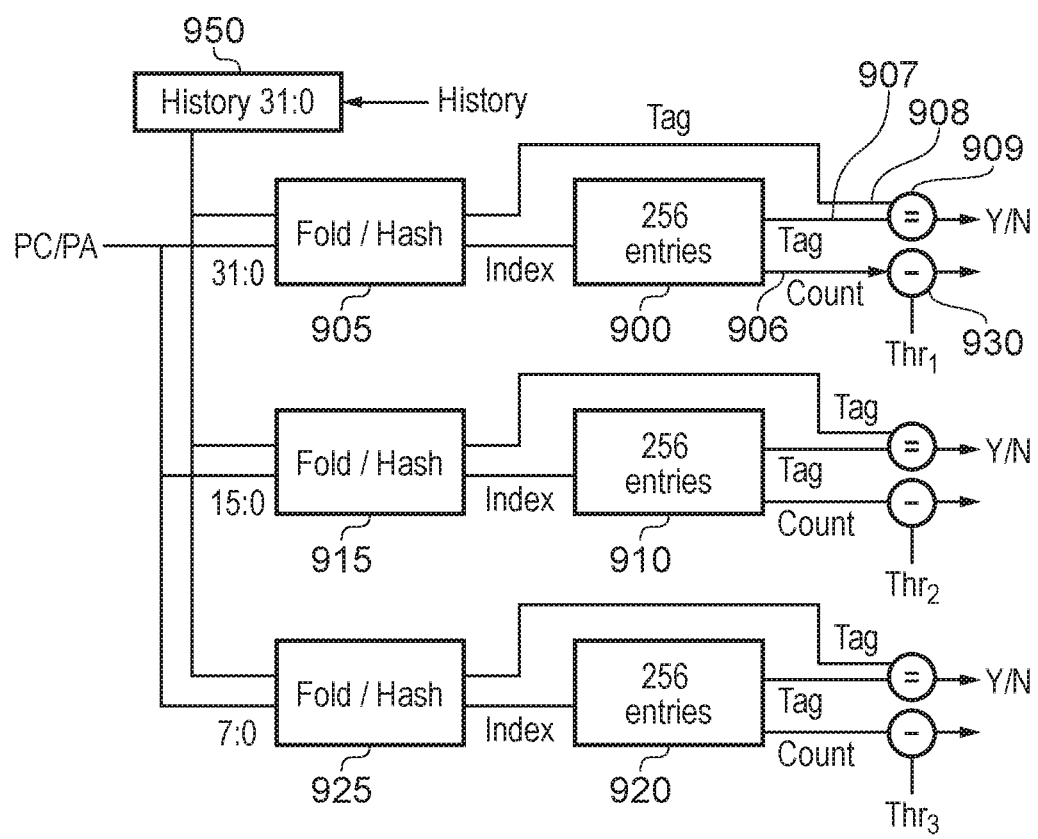
FIG. 9 schematically illustrates another example of predictor circuitry.

FIG. 9 schematically illustrates a further example of predictor circuitry. Here, the count values are stored in tables, for example of 256 entries (therefore addressed by an eight bit index) such that a value derived from one or both of the current program counter and the physical address being accessed is used to generate the index to choose an appropriate count value.

In this example, three such tables 900, 910, 920 are provided. The index in each case is generated by a different combination of bits of the program counter and/or physical address being accessed. The generation of the indexes is carried out by respective folding/hashing logic 905, 915, 925.

The folding/hashing logic 905 operates on all 32 bits (in the present examples) of the program counter and physical address. In an example, it folds these values together, for example by partitioning each of the program counter and physical address values into portions each of eight bits (for example, successive 8-bit portions starting at the LSB and ending at the MSB) and adding those portions together without carry (an exclusive-or operation). However, other bit reduction or hashing techniques could be used. The resulting index is used to index the appropriate entry in the table 900.

Each entry in the table 900 stores a respective count value and a tag. The tag is generated also from the program counter and/or physical address, but using a different folding or hashing technique. The tag is stored alongside the count value in the table 900 and is also separately regenerated by the folding/hashing logic 905. When a table entry is accessed, not only is the count 906 output but also the stored tag 907 which is compared with the tag 908 generated by the folding/hashing logic 905. A comparator 909 detects whether the two tag values are the same. If they are, then the comparison of the count value with a threshold ($thr_1$) by a comparator 930 is relevant to the prediction, and also the respective count value is modified (for example by change logic similar to the change logic 600, not shown in FIG. 9) in response to information received back about the outcome of a read request. If the tag values are not the same, this could just mean the aliasing effect of folding or hashing longer address values into shorter index values means that an incorrect entry has been read out for the current combination of program counter and physical address. In this case, the comparison by the comparator 930 is not used as part of the prediction process.

A similar arrangement is carried out by the folding/hashing logic 915, except that it uses only the least significant 16 bits of the program counter and/or physical address. Similarly, the folding/hashing logic 925 uses only the least significant 8 bits of the program counter and/or physical address. Each uses a similar arrangement of a comparator 909 and a comparator 930.

So, the three instances of folding/hashing logic 905, 915, 925 use respective different portions of the PC/PA bits, for example respective differently sized portions, to generate the index and tag. Smaller portions are more prone to the type of aliasing discussed above. In the event that the comparison of tags for two or more of the tables proves to be affirmative (the tags match) then the comparison with the threshold of the count value from that one of the tables which uses the larger number of bits of the program counter/physical address to generate its index is used. In other words, a table which is higher up (as drawn in FIG. 9) is used in the case of multiple tables having matching tags.

In other examples, the history of the outcome of recent requests, for example a 1 to indicate that the read request was serviced by the home node and a 0 to indicate that the read request was serviced by DRAM, arranged in an ordered (first in first out) register 950 of (say) 32 history values, where a least significant entry is a most recent history value, can be incorporated into the folding/hashing process in addition to or in place of the PC and/or PA, for example using the same portions (31:0, 15:0, 7:0) as discussed above.

FIG. 9 therefore provides an example of the predictor circuitry being configured to generate a prediction in dependence upon one or more of: a program counter value for a processing instruction initiating a data access request; and an address of a data item to be accessed in response to the data access request. In examples, the predictor circuitry is configured to generate (by the circuitry 905, 915, 925) an index from one or both of the program counter value and the address of the data item, and to access a table of counter values by the index. The circuitry 905, 915, 925 may generate a tag from one or both of the program counter value and the address of the data item and to store the tag in association with an entry in the table of counter values which is accessed by the index. In examples, the predictor circuitry (by the circuitry 905, 915, 925 and the comparators 909) is configured to retrieve a stored tag and to compare the retrieved tag with the tag generated from one or both of the program counter value and the address of the data item.

In FIG. 9, the predictor circuitry is configured to access two or more tables of counter values by respective indices generated from different respective portions of one or both of the program counter value and the address of the data item. As discussed above, in examples, when two or more tables have a stored tag which matches a generated tag, the predictor circuitry is configured to generate the prediction in dependence upon a counter value stored by that one of the two or more tables for which the index was generated by the greater number of bits of one or both of the program counter value and the address of the data item.

Figure 10:
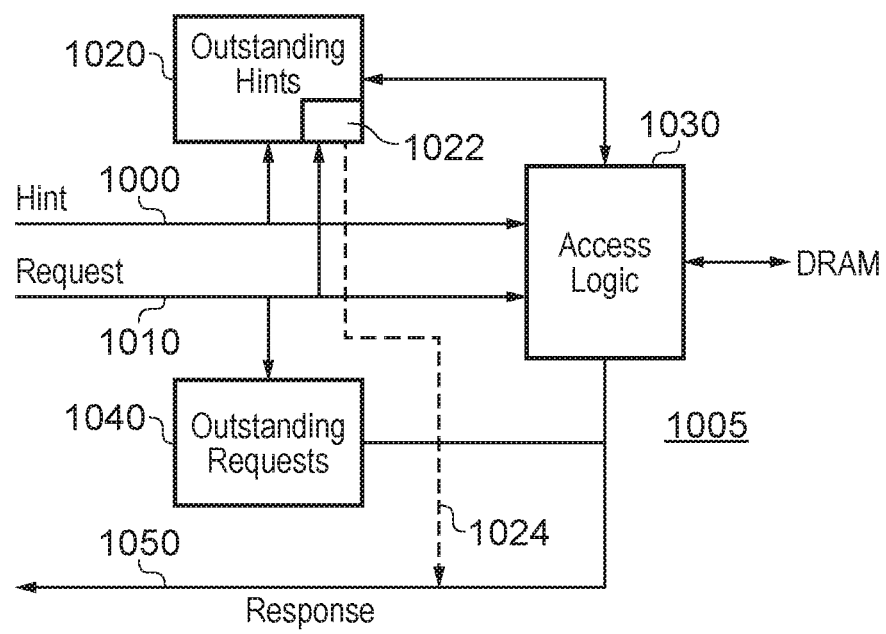
FIG. 10 schematically illustrates a memory controller.

FIG. 10 schematically illustrates a memory controller 1005 (such as the DMC 122, 132) arranged to receive one or both of a read hint 1000 and a read or write request 1010. A buffer of outstanding read hints 1020 is provided so that when a new read hint is received and is actioned by access logic 1030 initiating an access to the DRAM, information defining that hint is stored in the outstanding hint buffer 1020.

In examples, the read hint (the data access hint message) and the data access request (read request) each specify a data access by a range of one or more memory addresses. In the case that a subsequent request is received relating to the same memory address or address range as an outstanding hint, and the request is received sufficiently soon (to be discussed below) after the hint was received and action initiated, then detection circuitry 1022 deletes from the outstanding hint buffer 1020. Separately, the request is stored in an outstanding request buffer 1040. The access logic 1030 continues to access the relevant memory address or addresses and, at the appropriate time produces a response 1050. The response may include the data that was requested, in the case of a read request, and a completion acknowledgement which in some examples may accompany the last data item or data beat of the read response.

The detection circuitry 1022 is arranged to detect whether a read hint was active (for example, still held in the outstanding hint buffer 1020) at the time that a request corresponding to that read hint was received, and to generate a signal 1024 indicating the outcome of this detection.

The acknowledgement forming part or all of the response 1050 may include information identifying that the data was obtained from the DRAM (which the predictor circuitry can use to confirm that its prediction was correct). This can be implemented by indicating in the acknowledgement an identifier of the source of the response 340 (FIG. 3), for example as an identifier of the specific memory resource which provided the response 340, as an identifier of a classification of the type of memory resource which provided the response 340, and/or an indication that the response 340 was provided by DRAM.

The acknowledgement forming part or all of the response may also include an indication (in dependence upon the signal 1024) as to whether the read hint was still active at the time that the subsequent request was received, thereby indicating that the use of the hint was useful in saving a portion of the memory access latency.

If a hint is received and actioned (and stored in the outstanding hint buffer 1020) but no subsequent request is received (for example, because the HN was able to service the request after all) then after a predetermined time since the read hint was received and/or first stored in the outstanding hint buffer, or when the access logic 1030 indicates that a predetermined stage is reached in the processing of the access initiated by the hint, or the earlier of the two, or the later of the two, the detection circuitry 1022 retires the hint and deletes that hint from the outstanding hint buffer 1020.

So, when the memory access circuitry has initiated a data access for a given range of one or more memory addresses in response to a read hint, the memory access circuitry is configured to provide the accessed data as a data access response only when the memory controller receives a subsequent data access request specifying the given range of one or more memory addresses. A read hint alone does not lead (in example arrangements) to the return of the relevant data. It just initiates memory access in preparation for a subsequent read request.

If however a read request is subsequently received (after the read hint has been retired), the signal 1024 would be generated to indicate that a related read hint was not active at the time that the read request was received.

In the examples of prediction circuitry discussed above, count values or the like are changed in dependence upon whether a read request was serviced or fulfilled by the home node or by a reference to a slave node such as a DRAM. In other examples, the count values can be changed (instead or in addition) in dependence upon one or both of (i) whether a read hint was in fact provided (a detection which can be made at the prediction circuitry and/or the RN without the need for information back from the slave node) and (ii) whether a respective read hint was still active at the time that the subsequent request was received, thereby indicating that the use of the hint was useful in saving a portion of the memory access latency. If a "useful" read hint was provided, then this would tend to steer the count value or other prediction towards an indication that further read hints should be provided (for example, for that classification or hashed address). If a read hint was provided but it was not "useful", this could be arranged to steer the change of the count value(s) towards an indication that further read hints should not be provided. If a read hint was not provided but the read request was serviced by the slave node (for example, DRAM) then this could tend to steer the prediction towards an indication that further read hints should be provided. It will be appreciated that any individual instance of any of these outcomes may not, of itself, cause a change in the behaviour of the RN to issue or not to issue read hints (unless perhaps that individual instance causes a count to move to the other side of a threshold), but such an individual instance can still move the count value towards one outcome or the other, or in other words tend to steer the prediction one way or the other.

FIG. 10 therefore provides an example of a memory controller comprising memory access circuitry (such as the access logic 1030) configured to initiate a data access of data stored in a memory in response to a data access hint message 1000 received from another node in data communication with the memory controller; to access data stored in the memory in response to a data access request 1010 received from another node in data communication with the memory controller and to provide the accessed data as a data access response 1050 to the data access request.

Figure 11:
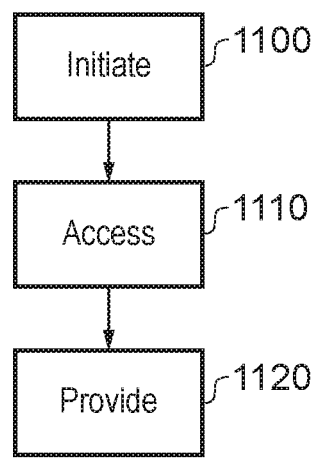
FIGS. 11 and 12 are schematic flowcharts illustrating methods.

FIG. 11 schematically illustrates a memory control method comprising:
- initiating, at a step 1100, a data access of data stored in a memory in response to a data access hint message received from another node in data communication with the memory controller;
- accessing, at a step 1110, data stored in the memory in response to a data access request received from another node in data communication with the memory controller; and
- providing, at a step 1120, the accessed data as a data access response to the data access request.

Figure 12:
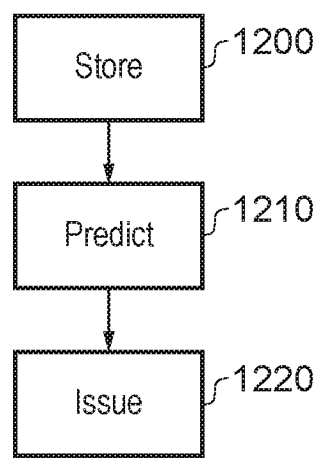

FIG. 12 schematically illustrates a data processing method comprising:
- storing, at a step 1200, prediction data indicating whether recent data access requests were fulfilled by a first data source or a second data source;
- predicting, at a step 1210, from the prediction data, whether a next data access request will be fulfilled by the first data source or the second data source, the first and second data sources being arranged so that if a data access request is not fulfilled by the first data source, it is fulfilled by the second data source; and
- issuing, at a step 1220, an indication, to the second data source, that a given data access request may need to be fulfilled by the second data source in response to the predictor circuitry predicting that the given data access request will be fulfilled by the second data source.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A data processing apparatus, comprising:
issue circuitry configured to issue data access requests to a first data source; and
prediction circuitry configured to determine whether to send a data access hint message to a second data source, the data access hint message indicating a possible subsequent data access request,
wherein the data processing apparatus is configured to send a data access request to the first data source and a data access hint message to the second data source which is configured to fulfil the data access specified by the data access request when the first data source is unable to fulfil that data access,
wherein the prediction circuitry is configured to determine whether to send the data access hint message to the second data source in response to information, received from one or both of the first data source and the second data source, indicating whether the second data source fulfilled one or more previous data access requests.

2. The data processing apparatus of claim 1, in which the data access hint message and the data access request each specify a data access by a range of one or more memory addresses.

3. The data processing apparatus of claim 2, in which the prediction circuitry is configured to store prediction data indicating whether recent data access requests were fulfilled by the first data source or the second data source and to predict, from the prediction data, whether one or more subsequent data access requests will be fulfilled by the first data source or the second data source, the first data source and the second data source being arranged so that if a data access request is not fulfilled by the first data source, it is fulfilled by the second data source.

4. The data processing apparatus of claim 2, the issue circuitry being configured to issue an indication, to the second data source, that a given data access request may need to be fulfilled by the second data source in response to the prediction circuitry predicting that the given data access request will be fulfilled by the second data source.

5. The data processing apparatus of claim 3, in which the prediction circuitry is configured to store the prediction data in response to information received from one or both of the first data source and second data source indicating which node fulfilled a recent data access request.

6. The data processing apparatus of claim 3, in which the prediction data comprises a count value, the prediction circuitry being configured to change the count value in dependence upon whether a recent data access request was fulfilled by the first data source or the second data source.

7. The data processing apparatus of claim 6, in which the prediction circuitry comprises a comparator to compare the count value with a threshold value.

8. The data processing apparatus of claim 6, in which the prediction circuitry is configured to change the count value by a first change amount in response to a recent data access being fulfilled by the first data source, and by a second change amount, having an opposite polarity to the first change amount, in response to a recent data access being fulfilled by the second data source.

9. The data processing apparatus of claim 8, in which the prediction circuitry is configured to vary one or both of the first change amount and the second change amount.

10. The data processing apparatus of claim 9, in which the prediction circuitry is configured to generate respective predictions for two or more classes of data access requests.

11. The data processing apparatus of claim 10, in which the two or more classes of data access requests are selected from the list consisting of: data read requests; instruction fetch requests; and address translation fetch requests.

12. The data processing apparatus of claim 11, in which the prediction circuitry is configured to generate a prediction in dependence upon one or more of: a program counter value for a processing instruction initiating a data access request; and an address of a data item to be accessed in response to the data access request.

13. The data processing apparatus of claim 12, in which the prediction circuitry is configured to generate an index from one or both of the program counter value and the address of the data item, and to access a table of counter values by the index.

14. The data processing apparatus of claim 13, in which the prediction circuitry is configured to generate a tag from one or both of the program counter value and the address of the data item and to store the tag in association with an entry in the table of counter values which is accessed by the index.

15. The data processing apparatus of claim 14, in which the prediction circuitry is configured to retrieve a stored tag and to compare the retrieved tag with the tag generated from one or both of the program counter value and the address of the data item.

16. The data processing apparatus of claim 15, in which the prediction circuitry is configured to access two or more tables of counter values by respective indices generated from different respective portions of one or both of the program counter value and the address of the data item.

17. The data processing apparatus of claim 16, in which, when two or more tables have a stored tag which matches a generated tag, the prediction circuitry is configured to generate the prediction in dependence upon a counter value stored by that one of the two or more tables for which the index was generated by the greater number of bits of one or both of the program counter value and the address of the data item.

18. A data processing system comprising
the data processing apparatus of claim 1;
a first data source to control coherency amongst data stored by the data processing system; and
one or more second data sources,
wherein the data processing apparatus and the first and second data sources are connected to one another via interconnect circuitry.

19. The data processing system of claim 18, in which
the data processing apparatus comprises a processor core;
the first data source comprises a memory and a memory controller; and
the one or more second data sources comprises a slave node having a higher-level memory.

* * * * *